(12) United States Patent
Saleh et al.

(10) Patent No.: US 7,352,692 B1
(45) Date of Patent: Apr. 1, 2008

(54) RESOURCE RESERVATION SCHEME FOR PATH RESTORATION IN AN OPTICAL NETWORK

(75) Inventors: Ali Najib Saleh, Ft. Lauderdale, FL (US); H. Michael Zadikian, McKinney, TX (US); Zareh Baghdasarian, La Canada, CA (US); Vahid Parsi, Sherman Oaks, CA (US)

(73) Assignee: Cisco Technology, Inc., San Jose, CA (US)

( * ) Notice: Subject to any disclaimer, the term of this patent is extended or adjusted under 35 U.S.C. 154(b) by 919 days.

(21) Appl. No.: 09/858,743

(22) Filed: May 16, 2001

Related U.S. Application Data

(63) Continuation-in-part of application No. 09/232,397, filed on Jan. 15, 1999, now Pat. No. 6,856,627.

(51) Int. Cl.
  *G06F 11/00* (2006.01)
  *H04L 12/56* (2006.01)
(52) U.S. Cl. ............... 370/216; 370/389; 370/392; 370/395.43; 370/401; 370/465
(58) Field of Classification Search ............ 370/216, 370/225, 226, 227, 228, 241, 242, 244, 248, 370/250, 395.41, 395.42, 395.43, 465, 395, 370/379, 400, 401, 389, 392, 410
See application file for complete search history.

(56) References Cited

U.S. PATENT DOCUMENTS

| | | | |
|---|---|---|---|
| 5,049,871 A | 9/1991 | Sturgis et al. | 370/224 |
| 5,093,824 A | 3/1992 | Coan et al. | 370/16 |
| 5,412,376 A | 5/1995 | Chujo et al. | 340/825.1 |
| 5,548,639 A * | 8/1996 | Ogura et al. | 379/221.04 |
| 5,590,118 A | 12/1996 | Nederlof | 370/218 |
| 5,596,722 A | 1/1997 | Rahnema | 395/200 |
| 5,646,936 A | 7/1997 | Shah et al. | 370/228 |
| 5,649,108 A | 7/1997 | Spiegel et al. | 395/200.12 |
| 5,687,167 A | 11/1997 | Bertin et al. | 370/254 |

(Continued)

FOREIGN PATENT DOCUMENTS

EP   0 781 068 A1   6/1997

(Continued)

OTHER PUBLICATIONS

Hideki Sakauchi, et al., "A Self-Healing Network With An Economical Spare-Channel Assignment", Proceedings of the Globecom '90 IEEE Telecommunications Conference & Exhibition, vol. 1, 1991, pp. 438-443.

(Continued)

*Primary Examiner*—Afsar Qureshi
(74) *Attorney, Agent, or Firm*—Campbell Stephenson LLP

(57) ABSTRACT

A method for reserving resources for restoration of a failed virtual path in a mesh optical network is defined. The method in one embodiment, defines multiple classes of service for the virtual path by allocating certain path performance, path implementation and path restoration related attributes to the virtual path. Each class of service defines the relative restoration priority of the virtual path. In a case of a path failure, the class of service is used by each node, to determine how the virtual path will be restored. The higher class of service guarantees a maximum acceptable restoration time during a path failure.

131 Claims, 3 Drawing Sheets

U.S. PATENT DOCUMENTS

| | | | |
|---|---|---|---|
| 5,737,319 A | 4/1998 | Croslin et al. | 370/255 |
| 5,781,528 A | 7/1998 | Sato et al. | 370/218 |
| 5,805,578 A | 9/1998 | Stirpe et al. | 370/255 |
| 5,805,593 A | 9/1998 | Busche | 370/396 |
| 5,835,696 A | 11/1998 | Hess | 395/182.08 |
| 5,881,048 A | 3/1999 | Croslin | 370/228 |
| 5,881,246 A | 3/1999 | Crawley et al. | 709/238 |
| 5,884,297 A | 3/1999 | Noven | 707/1 |
| 5,887,127 A * | 3/1999 | Saito et al. | 714/4 |
| 5,920,257 A | 7/1999 | Commerford | 340/506 |
| 5,933,422 A * | 8/1999 | Kusano et al. | 370/331 |
| 5,933,425 A | 8/1999 | Iwata | 370/351 |
| 5,959,972 A | 9/1999 | Hamami | 370/228 |
| 5,987,526 A | 11/1999 | Morales | 709/249 |
| 5,995,503 A | 11/1999 | Crawley et al. | 370/351 |
| 5,999,286 A | 12/1999 | Venkatesan | 359/117 |
| 6,011,780 A | 1/2000 | Vaman et al. | 370/237 |
| 6,041,037 A | 3/2000 | Nishio et al. | 370/228 |
| 6,041,049 A | 3/2000 | Brady | 370/351 |
| 6,047,331 A | 4/2000 | Medard et al. | 709/239 |
| 6,075,766 A | 6/2000 | Croslin | 370/225 |
| 6,075,775 A | 6/2000 | Ueki | 370/248 |
| 6,097,696 A | 8/2000 | Doverspike | 370/216 |
| 6,097,722 A | 8/2000 | Graham et al. | 370/395 |
| 6,101,167 A * | 8/2000 | Shimada | 370/225 |
| 6,115,753 A | 9/2000 | Joens | 709/242 |
| 6,130,876 A | 10/2000 | Chaudhuri | 370/228 |
| 6,130,881 A | 10/2000 | Stiller et al. | 370/238 |
| 6,134,671 A | 10/2000 | Commerford et al. | 714/4 |
| 6,148,000 A | 11/2000 | Feldman et al. | 370/397 |
| 6,154,778 A | 11/2000 | Koistinen et al. | 709/228 |
| 6,163,525 A | 12/2000 | Bentall et al. | 370/227 |
| 6,222,653 B1 | 4/2001 | Asahi | 359/110 |
| 6,259,673 B1 | 7/2001 | Yoshihara et al. | 370/238 |
| 6,259,679 B1 * | 7/2001 | Henderson et al. | 370/254 |
| 6,272,107 B1 | 8/2001 | Rochberger et al. | 370/216 |
| 6,275,492 B1 | 8/2001 | Zhang | 370/392 |
| 6,282,170 B1 | 8/2001 | Bentall et al. | 370/225 |
| 6,292,464 B1 | 9/2001 | Elahmadi et al. | 370/223 |
| 6,301,244 B1 | 10/2001 | Huang et al. | 370/351 |
| 6,304,549 B1 | 10/2001 | Srinivasan et al. | 370/230 |
| 6,324,162 B1 * | 11/2001 | Chaudhuri | 370/225 |
| 6,347,078 B1 | 2/2002 | Narvaez-Guarnieri et al. | 370/230 |
| 6,370,119 B1 | 4/2002 | Basso et al. | 370/252 |
| 6,400,681 B1 | 6/2002 | Bertin et al. | 370/218 |
| 6,430,150 B1 | 8/2002 | Azuma et al. | 370/218 |
| 6,457,050 B1 | 9/2002 | Cowan et al. | 709/224 |
| 6,463,062 B1 | 10/2002 | Buyukkoc et al. | 370/395.1 |
| 6,493,317 B1 * | 12/2002 | Ma | 370/237 |
| 6,504,845 B1 | 1/2003 | Petersen et al. | 370/412 |
| 6,643,254 B1 * | 11/2003 | Kajitani et al. | 370/217 |
| 6,718,480 B1 * | 4/2004 | Ogura et al. | 714/4 |
| 6,728,205 B1 | 4/2004 | Finn et al. | 370/217 |
| 2002/0118636 A1 | 8/2002 | Phelps et al. | 370/222 |
| 2002/0186654 A1 | 12/2002 | Tornar | 370/225 |
| 2002/0191247 A1 | 12/2002 | Lu et al. | 359/124 |

FOREIGN PATENT DOCUMENTS

| | | |
|---|---|---|
| EP | 0 841 824 A2 | 5/1998 |

OTHER PUBLICATIONS

Baruch Awerbuch, et al., "Distributed Controls For PARIS", Proc. Annual ACM Symp. On Principles Of Distributed Computing, Aug. 22, 1999, pp. 145-159.

Sujai Hajela, "HP OEMF: Alarm Management In Telecommunications Networks", *Hewlett Packard Journal*, Oct. 1996, vol. 47, No. 5, pp. 22-30.

Ali Saleh, H. Michael Zadikian, Zareh Baghdasarian, Vahid Parsi, "A Method For Routing Information Over A Network", filed Jan. 15, 1999, U.S. Appl. No. 09/232,397.

H. Michael Zadikian; Steven E. Plote, John C. Adler, David Parish Autry, Ali Saleh, "Method of Providing Network Services", filed Jan. 4, 2000; U.S. Appl. No. 09/477,498.

Ali Saleh, "A Method For Path Selection In A Network", filed Jan. 4, 2000; U.S. Appl. No. 09/478,235.

Ali N. Saleh and Stevan E. Plote, "A Network Addressing Scheme For Reducing Protocol Overhead In An Optical Network", filed Sep. 2, 1999; U.S. Appl. No. 09/389,302.

Ali Saleh, H. Michael Zadikian; John C. Adler, Zareh Baghdasarian, Vahid Parsi, "Configurable Network Router", filed Jan. 15, 1999; U.S. Appl. No. 09/232,395.

Ali N. Saleh, Douglas E. Duschatko, Lane Byron Quibodeaux, "Method And Apparatus For A Rearrangeably Non-Blocking Switching Matrix", filed Jan. 4, 2000; U.S. Appl. No. 09/477,166.

H. Michael Zadikian, Ali Saleh; John C. Adler, Zareh Baghdasarian, Vahid Parsi, "A Resource Management Protocol For A Configurable Network Router", filed Jan. 4, 2000; U.S. Appl. No. 60/174,323.

Ronald Alan Russell and Michael Kevin Anthony, "A Method And Apparatus For Isolating Faults In A Switching Matrix", filed Jan. 4, 2000; U.S. Appl. No. 09/477,217.

H. Michael Zadikian, Ali Saleh, John C. Adler, Zareh Baghdasarian, Vahid Parsi, "A Method of Allocating Bandwidth in an Optical Network" (as amended), filed Jan. 15, 1999, U.S. Appl. No. 09/232,396.

Tha ATM Forum Technical Committee, "Interim Inter-switch Signaling Protocol (IISP) Specification v1.0", af-pnni-0026.000, Dec. 1994, pp. 1-34.

The ATM Forum Technical Committee, Private Network-Network Interface Specification Version 1.0 (PNNI 1.0), afpnni-0055.000, Mar. 1996, pp. v-xviii, pp. 19, 1-366.

The ATM Forum Technical Committee, Private Network-Network Interface Specification Version 1.0 Addendum (Soft PVC MIB), af-pnni-0066.000, Sep. 1996.

The ATM Forum Technical Committee, Addendum to PNNI V1.0 for ABR parameter negotiation, af-pnni-0075.000, Jan. 1997.pp. 2-3.

The ATM Forum Technical Committee, PNNI V1.0 Errata and PICS, af-pnni-0081.000, May 1997, pp. 2-224.

J. Moy, "OSPF Version 2", Ascend Communications, Inc., Apr. 1998.

K. Murakami, et al., "A MAPOS version 1 Extension—Switch-Switch Protocol", NTT Laboratories, Jun. 1997.

F. Baker, et al., "OSPF Version 2 Management Information Base", Cicso Systems, Nov. 1995.

F. Baker, et al., "PPP Bridging Control Protocol (BCP)", IBM, Jun. 1994.

E. Decker, "Definitions of Managed Objects for Bridges", Cicso Systems, Inc., Jul. 1993.

\* cited by examiner

RESOURCE RESERVATION SCHEME FOR PATH RESTORATION IN AN OPTICAL NETWORK

CROSS-REFERENCES TO RELATED APPLICATIONS

This application is continuation-in-part of patent application Ser. No. 09/232,397, filed Jan. 15, 1999 now U.S. Pat. No. 6,856,627 and entitled "A METHOD FOR ROUTING INFORMATION OVER A NETWORK," having H. M. Zadikian, A. N. Saleh, Z. Baghdasarian, and V. Parsi as inventors.

This application is also related to patent application Ser. No. 09/232,395, filed Nov. 15, 1999 and entitled "A CONFIGURABLE NETWORK ROUTER," having H. M. Zadikian, A. N. Saleh, J. C. Adler, Z. Baghdasarian, and V. Parsi as inventors.

These related applications are assigned to Cisco Technology, Inc., the assignee of the present invention, and are hereby incorporated by reference, in its entirety and for all purposes.

BACKGROUND OF THE INVENTION

1. Field of the Invention

This invention relates to the field of information networks, and more particularly relates to a protocol for configuring routes over a network.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of lightwave communications carried over fiber-optic cables. The use of lightwave communications provides several benefits, including high bandwidth, ease of installation, and capacity for future growth.

Optical infrastructures are capable of transmission speeds in the gigabit range, which helps address the ever-increasing need for bandwidth mentioned above. Such infrastructures employ various topologies, including ring and mesh topologies. In order to provide fault protection, ring topologies normally reserve a large portion (e.g. 50% or more) of the network's available bandwidth for use in restoring failed circuits.

Traditionally, the networks allocate bandwidth and resources for the transmission of data and assign certain priorities to data paths such as the Quality of Service and like. These priorities only guarantee that if and whenever a data path is available, the high priority data will be transmitted first. In case of a data path failure, the transmission and data path priorities do not guarantee the restoration of data traffic. The high-level transmission protocol generally relies on the underlying physical architecture to restore the data paths. Thus, a user can only configure the data transmission priority for the data and depend upon the physical network architecture to restore data paths in case of a failure.

Ring topologies are capable of quickly restoring failed circuits. This capability is important in providing reliable service to customers, and is particularly important in telephony applications, where a failure can result in alarms, dropped calls, and, ultimately, customer dissatisfaction and lost revenue. In a similar vein, because of bandwidth demands, protocol overhead related to provisioning, restoration, and other functions should be kept to a minimum, to make the maximum amount of bandwidth available for use by customers.

An alternative to the ring topology, the mesh topology reduces the amount of bandwidth needed for protection. The mesh topology is a point-to-point topology, with each node in the network coupled to one or more other nodes. Because a circuit may be routed through various combinations of the network's nodes and over the various links which connect them, excess capacity through a given node or over a given link can serve to protect several circuits. However, the restoration of a circuit following a failure in a mesh topology can consume a relatively large amount of time.

SUMMARY

In one embodiment, the present invention reduces the time and resources required to restore a failed virtual path in a mesh topology optical network by reserving resources for restoration for a virtual path provisioned in the optical network. Multiple restoration related parameters are configured at the time of provisioning of the virtual path. The combination of these parameters is defined as class of service. In the event a virtual path fails, the class of service determines if and how the virtual path will be restored. The class of service defines a relative restoration priority of the virtual path in the network. Mission-critical virtual paths are assigned a higher class of service to ensure a guaranteed maximum acceptable restoration time.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Provisioning of Network Nodes

Figure 1:
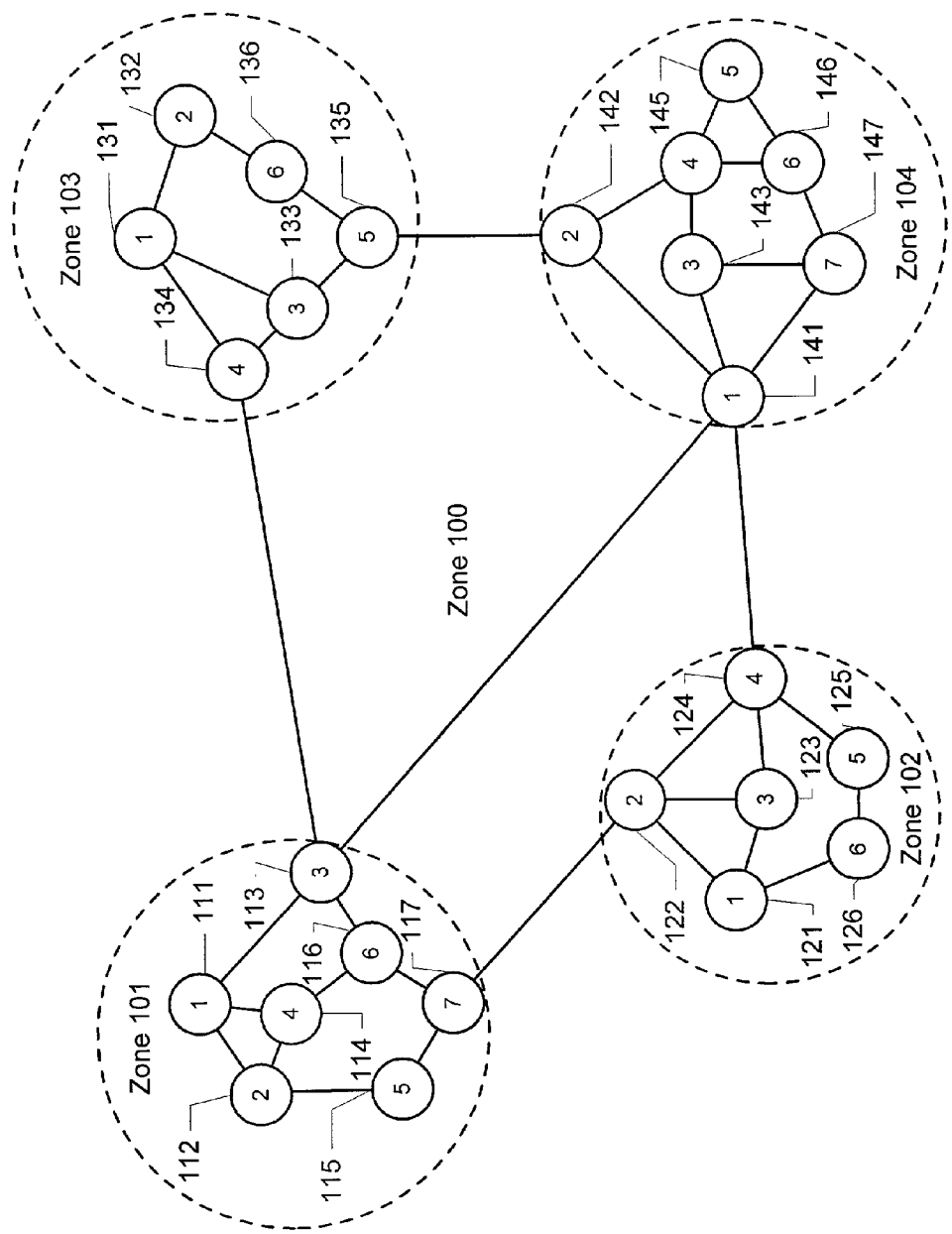
FIG. 1 is a block diagram of a zoned network.

FIG. 1 illustrates an exemplary zoned mesh network organized into a backbone, zone 100, and four configured zones, zones 101-104. The solid circles in each zone represent network nodes and the numbers within the circles represent node addresses. Network 100 includes networknodes 111-117, 121-126, 131-136, and 141-147. The dashed circles represent network zones. The network depicted in FIG. 1 has four configured zones (zones 101-104 (addressed as zones 1-4) and one backbone (zone 100). Network nodes 113, 117, 122, 124, 134, 135, 141, and 142, are boundary or proxy nodes because they connect to more than one zone. All other nodes are interior nodes because their links attach only to nodes within the same zone.

A non-zoned topology can also be configured between the network nodes. In a non-zoned mesh topology, nodes are combined into one network with no boundary or proxy node. Once a mesh network topology has been defined (i.e., zoned or non-zoned), the user can configure one or more end-to-end connections that can span multiple nodes (or zones), an operation is referred to herein as provisioning. For each virtual path to be provisioned, a physical path must be selected and configured. Each set of physical connections that are provisioned creates an end-to-end connection between the two end nodes that supports a virtual point-to-point link (referred to herein as a virtual path or VP). The resulting VP has an associated capacity and an operational state, among other attributes.

In a network according to one embodiment of the present invention, VPs may be provisioned statically or dynamically. For example, a user can identify the nodes which will comprise the virtual path and manually configure each node to support the given virtual path. The selection of nodes may be based on any number of criteria, such as Quality of Service (QoS), latency, cost, distance traveled in the network and the like. Alternatively, the VP may be provisioned dynamically using any one of a number of methods. The provisioning information is then forwarded to all the nodes in the network to store information in node's network topology database. Each node periodically updates this information to efficiently maintain resources and in case of path failure, effectively allocate appropriate resources needed for specific virtual path for path restoration.

The end nodes of a VP can be configured to have a master/slave relationship. The terms source and destination are also used herein in referring to the two end-nodes. In such a relationship, the node with a numerically lower node ID typically assumes the role of the master (or source) node, while the other assumes the role of the slave (or destination) node although the opposite arrangement is also acceptable. Any intermediate node is referred to herein as tandem node. Generally, the source node assumes all provisioning responsibilities and the destination node simply waits for a message from the source node informing the destination node of the VP's new physical path. This information includes node identifications, if any, of tandem nodes of that path. In a zoned mesh topology, if a virtual path spans over multiple zones, the border node or proxy node of each zone acts as source node for their particular zone. As will be apparent to one of skills in the art, the opposite convention or another paradigm could easily be employed.

Class of Service

To guarantee the restoration of a VP in case of a failure, each VP is assigned a restoration priority level. The restoration priority level, also referred to herein as the VP's Class of Service (CoS), determines the VP's relative priority with regard to performance within the network and restoration in the event of a failure within the network. A VP is typically assigned a CoS during provisioning, although in some cases, the CoS can be assigned after the provisioning. Depending upon the CoS assigned to a VP during provisioning, the resources for restoration can be reserved at the time of provisioning. In case of a path failure, a failed VP's CoS is used to determine whether and how the failed VP will be restored. If the failed VP is to be restored, the failed VP's CoS can be used to determine which restoration scheme to employ and the amount of time allocated for the restoration. In one scenario, four CoS levels (0-3) are nominally defined, although a larger or smaller number of CoS levels can be used. According to one embodiment of current invention, CoS 0 is defined as the lowest CoS, with CoS 3 being the highest. The resources for restoration of a VP are reserved according to the VP's CoS. The restoration priority spans from no resources (i.e. an unprotected path) for a VP with the lowest CoS, to redundant VP resources for a VP with the highest CoS. An example for a CoS scheme having four classes is now described in detail.

CoS 0—Low-Priority Traffic

CoS 0 is assigned to a VP that carries low-priority information. VPs from this class are typically not restored upon network failure. The user can control, on a VP-by-VP basis, whether a given VP should be protected from a failure. Upon failure of a CoS 0 VP, a network alarm is generated. However, the VP remains inactive until all other failures along the working path have been repaired.

A basic characteristic of a CoS 0 VP is that its working bandwidth is pre-emptable; the VP's resources can be reclaimed for use by other, higher-priority VPs (higher CoS VPs). So, in case of a failure of a high-CoS VP, if additional bandwidth is not available to restore that VP for restoration purposes, the network will tear down the traffic on the CoS 0 VP and assign the CoS 0 VP's bandwidth resources to the alternate path of another failed higher-CoS VP in the network. Another configurable attribute of VPs with CoS 0 is protection channel access (PCA). The PCA allows the access to standby physical paths of other VP's in the network. A VP with a CoS of 0 can be allowed to use the standby physical paths of other VP's in the network. If a standby physical path is available in the network, the network may allow backed-up information traffic on CoS 0 VP to temporarily use the available resources to relieve congestion and more quickly move information across the network.

CoS 1—Restorable Low Priority Traffic

VPs having a CoS of 1 are assigned a single path when provisioned but are restorable in case of a failure. Restoration is guaranteed, but the restoration time can be longer than what might be needed for critical path traffic such as voice traffic. In one embodiment, a dynamic unicast method of restoration is employed. In this approach, the node that discovers the failure initiates a restoration request and forwards the request to the source node of the VP. The source node initiates a restoration process by generating a resource request. The resource request is then forwarded to other nodes in the network that have enough bandwidth to support an alternate path for the failed VP. As these other nodes receive the restoration request, each node processes the request by allocating requested resources for the failed VP and forwards the request to next node until the request reaches the destination node. If the required resources are not available at any of the node, that node will respond with a negative acknowledgement. Upon receiving the negative acknowledgement, the source node will generate another request and forward the request to a different set of nodes that have enough bandwidth to support an alternate path for the failed VP. Thus, there is only one restoration request outstanding at any given time in the network. Additional information on a dynamic unicast restoration method may found in commonly-assigned U.S. patent application Ser.

No. 09/891,022. filed Jun. 25, 2001 and entitled "A Method For Restoring A Virtual Path In An Optical Network Using Dynamic Unicast."

The "restoration time guarantees" for CoS 1 depend on the network configuration and available bandwidth. One of skill in the art will appreciate that a combination of another set of performance and implementation related attributes such as PCA, releaseability of resources and others can also be defined for this CoS based on network configuration and planning, user need, and other such requirements.

CoS 2—Premium Traffic

VPs having a CoS of CoS 2, in an embodiment employing what is referred herein as dynamic broadcast restoration method, are provisioned on a single physical path but preferably are restored using all possible resources available at all or substantially all nodes to ensure fast recovery of the VP. Certain quantitative guarantees can be made on the restoration time of CoS 2 VPs, depending on network configuration. For example, according to one embodiment of present invention, this class of service can be configured to guarantee recovery in less than 50 ms, as is often required of telecommunications related network connections, without having to pre-compute or pre-establish the alternate route. In case of a failure, the source node 'floods' the network with path restoration request to find an alternate path. The resource request is then forwarded to other nodes in the network that have enough bandwidth to support an alternate path for the failed VP. As these other nodes receive the restoration request, each node processes the request by allocating requested bandwidth (or other resources) for the failed VP and forwards the request to next node until the request reaches the destination node. The destination node then responds with a positive response that follows a reverse route back to the source node. Requests that are unable to reach the destination node result in negative response that likewise follow a corresponding route back to the source node. Nodes in the network that receive the positive response then commit the allocated bandwidth for use in restoring the VP. In contrast, nodes in the network that receive the negative response deallocate the allocated bandwidth so that it may again be made available for other network activity. These techniques are described in patent application Ser. No. 09/232,397, now U.S. Pat. No. 6,856,627, for "A Method for Routing Information over a Network," as previously incorporated herein, and in commonly-assigned U.S. patent application Ser. No. 09/750,668, filed on Dec. 29, 2000 and entitled "A Virtual Path Restoration Scheme Using Fast Dynamic Mesh Restoration in an Optical Network", which is hereby incorporated by reference, in its entirety and for all purposes.

The restoration request is sent to tandem nodes that may provide a path to the destination node while also offering enough bandwidth capacity to satisfy the failed VP's needs. Each request is processed individually by the tandem nodes. If the resources are available, the tandem node accepts only the first successful request to avoid multiple allocation of resource for the alternate path. The source node accepts first successful response to path restoration request as the alternate path. The VP is then switched to this newly-created alternate path.

CoS 3—Mission Critical Traffic

VPs having a CoS of 3 are used for mission-critical application, where virtually no disruption of traffic can be tolerated. At the time of path provisioning, CoS 3 VPs are assigned two distinct paths, a primary path and a secondary path. Each path is preferably link-and-node disjoint. Only one of these paths is active at any time, while the other is in standby mode. A failure along the active path will cause traffic to be switched over to the standby path. The paths are provisioned by two independent provisioning commands. Each CoS 3 VP has an alternate VP to provide support in the case of a failure. The switching of paths can be done by either the source or destination node, independently, based on the error rate each node receives. There should be virtually no down time on CoS 3 VPs. This method is referred to herein as 1+1 protection. This method is described in commonly-assigned U.S. patent application Ser. No. 09/859,166, filed on May 16, 2001 and entitled "A Method for Restoring a Virtual Path in an Optical Network Using 1+1 Protection," which is hereby incorporated by reference, in its entirety and for all purposes.

One variation on such a scheme is 1:N protection, which allows a group of N VPs to share one or more alternate protection paths. In this scheme, the bandwidth of alternate path is share by multiple CoS 3 VPs based on their maximum bandwidth requirements. The reservation of resources is done at the time of provisioning of the paths. The network can also dynamically alter the bandwidth use of the alternate path for each VP based on the traffic analysis at the time of failure while guaranteeing the maximum bandwidth initially allocated and so maintaining network efficiency.

Yet another variation of this scheme is 1:1 protection. This scheme reserves an alternate path for CoS 3 VP in a manner similar to 1+1 protection. However, with 1:1 protection, the alternate path is not always available as a secondary path. When CoS 3 VP is not using this secondary path, certain VP's with lower CoS are allowed to use the alternate path. In case of a failure on the primary path of CoS 3 VP, the network removes any lower-CoS traffic from the alternate path and generates appropriate alarms. Then, the traffic of CoS 3 is switched on to the alternate path. This ensures maximum efficiency of the network yet guarantees meeting maximum acceptable restoration time for mission-critical information (e.g., voice and data information) on CoS 3 VPs. Additional information on such methods may found in commonly assigned U.S. patent application Ser. No. 09/876,380. filed June 7, 2001 and entitled "A Method for Restoring a Virtual Path in an Optical Network Using 1:N Protection."

Class of Service Attributes:

Each CoS typically includes certain restoration-related attributes. Table 1 illustrates an example of attributes that can be used in identifying various CoS's (including that for virtual path restoration) according the example CoS scheme first described. Table 2 describes the attributes used in defining a class of service. These attributes include restoration method, releasability of resources, protection channel access and predefined restoration time. Other attributes, such as reliability, latency, availability, and the like, can be added to each class on an implementation-by-implementation basis, as the network planning, user needs and other constraints dictate.

TABLE 1

| | Class of Service | | | |
|---|---|---|---|---|
| CoS | Restoration Method | Releasability of Resources? | Protection Channel Access? | Restoration Time |
| 0 | None or Dynamic/ Unicast | Releasable | X | <=2 seconds |

TABLE 1-continued

Class of Service

| CoS | Restoration Method | Releasability of Resources? | Protection Channel Access? | Restoration Time |
|---|---|---|---|---|
| 1 | Dynamic/Unicast | X | X | <=250 ms |
| 2 | Dynamic/Broadcast | Not Releasable | X | <=50 ms |
| 3 | Static/Pre-planned | Not Releasable | Not Accessible | <=50 ms |

X = May be. The value is based on network configuration and user's need for information transmission integrity, speed and other similar factors.

If no restoration method is defined i.e., the restoration method field is set to none, the VP is not restorable until all VP related physical failures are cleared. Otherwise, defining a restoration method means the VP is restorable using defined restoration scheme.

TABLE 2

CoS attributes

| Attribute | Description |
|---|---|
| Restoration method | Multiple restoration schemes that define different methods of restoring a VP after the failure of a VP |
| Releasablity of resources | Indicates whether the resources of this VP are releasable in case of path failure of a higher CoS VP. If the resources are releasable, the resources of this VP can be claimed by failed higher CoS VPs. |
| Protection channel access | Indicates the accessibility of available bandwidth on the working path. Usually, lower CoS VPs are allowed to access extra bandwidth of their working path to ensure a reasonable information transmission rate since the resource of these VPs are always preemptable. |
| Restoration time | The maximum amount of time guaranteed for path restoration. Each type of restoration scheme is associated with certain amount of restoration time that will allow the information traffic to be restored on an alternate path and avoid service interruption. |

As stated above, these parameters need not be the only parameters assigned for a class of service. These parameters are an example of such parameters that allow the definition of a guaranteed restoration scheme for any class of service. Other parameters can be used to further define the level of service offered by each class of service based VP on the network configuration, user needs, revenue potential and other aspects of network planning. These attributes can be dynamically altered on a temporary basis for information transmission integrity. The combination of these parameters can be dynamically adjusted to allow temporary information transmission integrity, so long as the network's bandwidth permits and the user is willing to compensate for such dynamic adjustments of the class of service. For example, a user may define certain reliability criteria for the VP. In case of traffic congestion, the network can use reliability criteria to determine how quickly the VP should be restored. Lower reliability factor may delay the restoration, even when a restoration scheme is defined for the VP.

Figure 2:
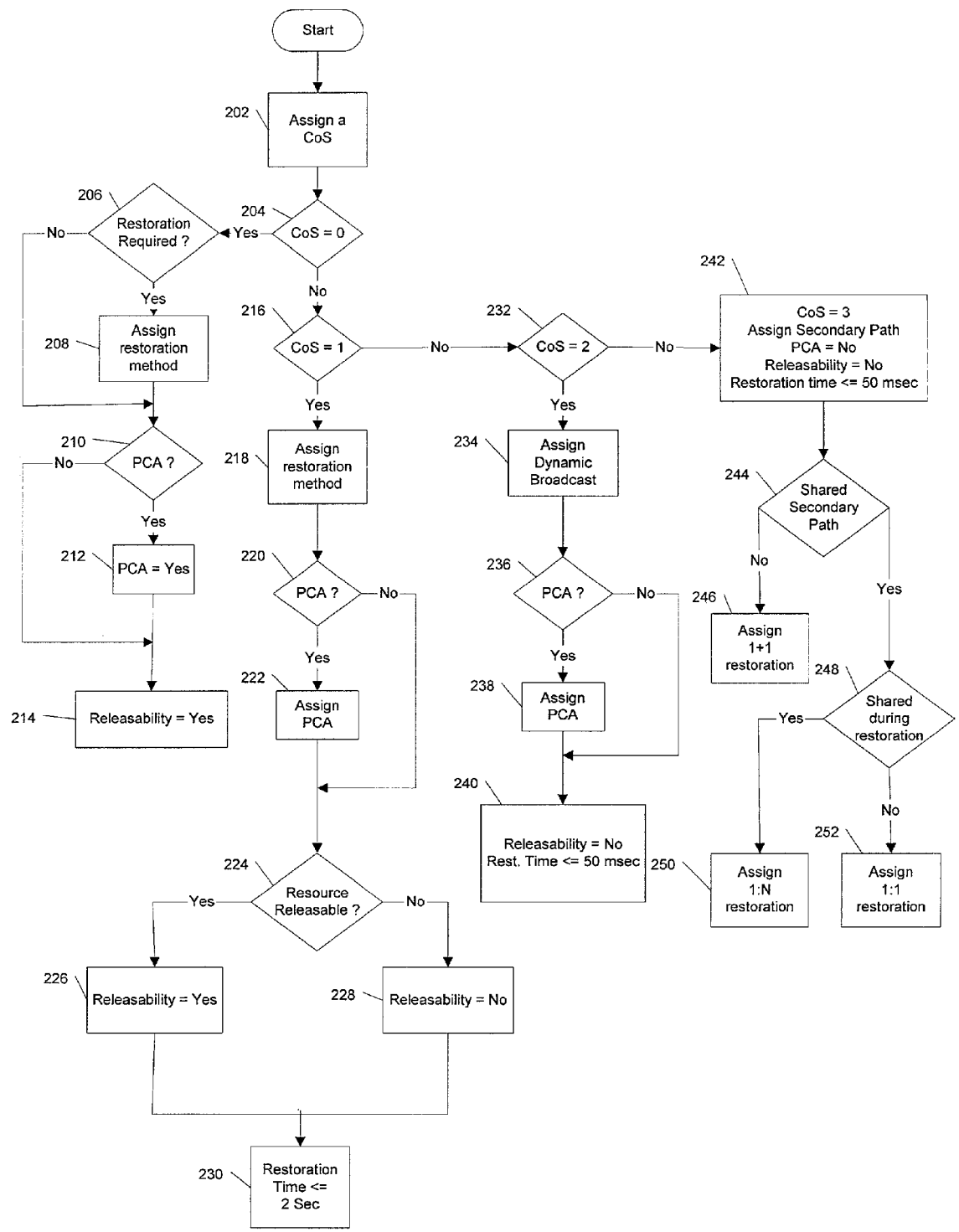
FIG. 2 is a flow diagram illustrating the steps performed during a process of assigning CoS to a virtual path.

FIG. 2 is a flow diagram illustrating an example of the steps performed during a process of assigning a CoS to a VP according an embodiment of present invention. These steps can be performed in any order. The CoS is assigned to a VP according to the priority of traffic moving through the VP (step 202). If a CoS of 0 is assigned (i.e., lowest priority in the present example), the restoration requirements of the VP are determined (steps 204-206). Typically, no restoration scheme is assigned to a VP of CoS 0. However, if the priority of traffic to be carried by the VP requires restoration in case of a failure, a restoration method is assigned (step 208). Generally, a dynamic unicast restoration method is assigned to a CoS 0 VP. Next, the need for access to protection channel is determined (step 210). If the VP requires access to protection channel, the PCA parameter is set to allow the VP access to a protection channel (step 212). The releasability parameter determines whether the resources of a VP with CoS of 0 can be released for use by other VPs that have a higher CoS. Typically, the resources of a CoS 0 VP (i.e., a low priority VP in the present example) are releasable for use by other VPs, and so the releasability parameter is set accordingly (step 214).

If the VP is a CoS 1 VP, a restoration method is assigned. Generally, a CoS 1 VP is restored using a dynamic unicast restoration method (steps 216-218). Because a CoS 1 VP is restored in case of a failure, access to the protection channel is not required. However, if the need exists, the PCA parameter (also refer to herein as the accessibility parameter) is set to allow the use of the protection channel (steps 220-222). Depending upon the network's configuration and traffic priority, a user can choose to allow the network to release the resources of CoS 1 VPs for another VP with a higher CoS. If the resources of a given CoS 1 VP are releasable, the releasability parameter is set accordingly (steps 224-228). CoS 1 VPs are guaranteed a restoration time. In the present example, a restoration time of less than 2 seconds is guaranteed for a CoS 1 VP (step 230).

If the VP is a CoS 2 VP, a more robust restoration scheme (a dynamic broadcast restoration method) is assigned to the VP (steps 232-234). Typically, CoS-2 VPs do not require access to the protection channel. However, if user need and network configuration require, access to protection channels can be provided to CoS-2 VPs. In such a case, the PCA parameter is set accordingly (steps 236-238). The resources of CoS-2 VPs are typically not released. In present example, the restoration is guaranteed to be within less than about 50 milliseconds (step 240).

According to present example of an embodiment, CoS 3 VPs are assigned a higher priority than other VPs. For example, a CoS 3 VP can be assigned a secondary virtual path. Because a secondary path is assigned to a CoS 3 VP, access to the protection channel is generally not required. As a result of the CoS 3 VP's high priority, the resources of CoS 3 VPs are not released. For CoS 3 VPs the restoration is guaranteed to be completed in less than about 50 milliseconds (step 242).

Depending upon the type of secondary path allocated to the CoS-3 VP, other VPs can share the allocated secondary path. If the sharing of secondary path is not required, the CoS 3 VP can be assigned a 1+1 protection scheme (steps 244-246). The 1+1 protection scheme is described in commonly-assigned U.S. patent application entitled "A Method for Restoring a Virtual Path in an Optical Network Using 1+1 Protection," as previously incorporated herein. When the secondary path is shared by a lower priority traffic that can be removed during restoration, then a 1:1 protection scheme can be assigned. If the secondary path is shared by other VPs during restoration, then a 1:N protection scheme can be assigned (steps 248-252). Further information on the 1:N protection may be found in "A Method for Restoring a Virtual Path in an Optical Network Using 1:N Protection," referenced above.

Figure 3:
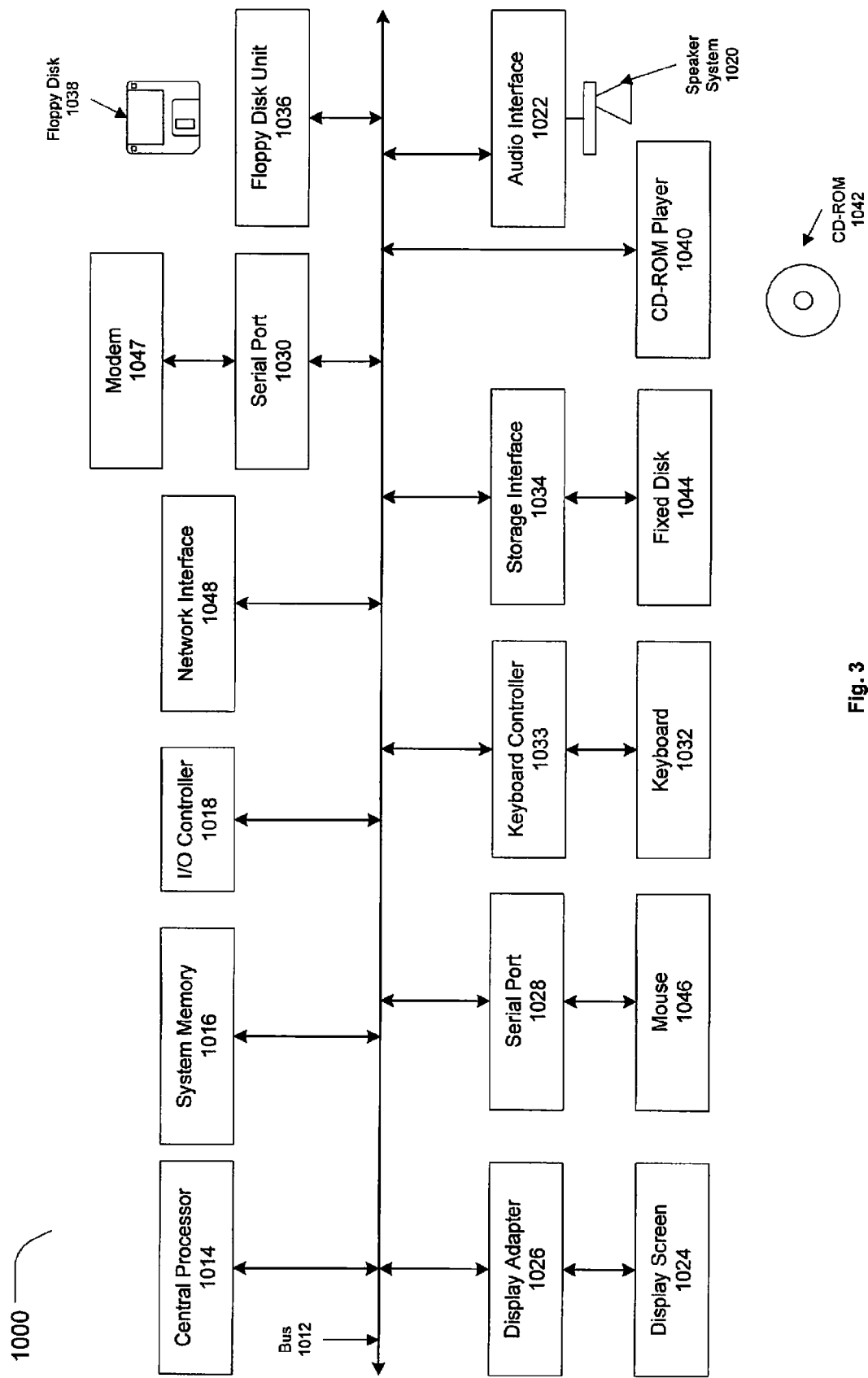
FIG. 3 is a block diagram of a host computer system usable for implementing the present invention.

FIG. 3 depicts a block diagram of a host computer system 1000. Host computer system 1000 includes a bus 1012 which interconnects major subsystems of host computer system 1000. These subsystems include a central processor 1014, a system memory 1016 (typically RAM, but which may also include ROM, flash RAM, or the like), an input/output controller 1018, an external audio device such as a speaker system 1020 via an audio output interface 1022, an external device such as a display screen 1024 via display adapter 1026, serial ports 1028 and 1030, a keyboard 1032 (interfaced with a keyboard controller 1033), a storage interface 1034, a floppy disk drive 1036 operative to receive a floppy disk 1038, and a CD-ROM drive 1040 operative to receive a CD-ROM 1042. Also included are a mouse 1046 (or other point-and-click device, coupled to bus 1012 via serial port 1028), a modem 1047 (coupled to bus 1012 via serial port 1030) and a network interface 1048 (coupled directly to bus 1012).

Bus 1012 allows data communication between central processor 1014 and system memory 1016, which may include both read only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components. Applications resident with host computer system 1000 are generally stored on and accessed via a computer readable medium, such as a hard disk drive (e.g., fixed disk 1044), an optical drive (e.g., CD-ROM drive 1040), floppy disk unit 1036 or other storage medium. Additionally, applications may be in the form of electronic signals modulated in accordance with the application and data communication technology when accessed via network modem 1047 or interface 1048.

Storage interface 1034, as with the other storage interfaces of host computer system 1000, may connect to a standard computer readable medium for storage and/or retrieval of information, such as a fixed disk drive 1044. Fixed disk drive 1044 may be a part of host computer system 1000 or may be separate and accessed through other interface systems. Many other devices can be connected such as a mouse 1046 connected to bus 1012 via serial port 1028, a modem 1047 connected to bus 1012 via serial port 1030 and a network interface 1048 connected directly to bus 1012. Modem 1047 may provide a direct connection to a remote server via a telephone link or to the Internet via an internet service provider (ISP). Network interface 1048 may provide a direct connection to a remote server via a direct network link to the Internet via a POP (point of presence).

Many other devices or subsystems (not shown) may be connected in a similar manner. Conversely, it is not necessary for all of the devices shown in FIG. 3 to be present to practice the present invention. The devices and subsystems may be interconnected in different ways from that shown in FIG. 3. The operation of a computer system such as that shown in FIG. 3 is readily known in the art and is not discussed in detail in this application. Code to implement the present invention may be operably disposed or stored in computer-readable storage media such as one or more of system memory 1016, fixed disk 1044, CD-ROM 1042, or floppy disk 1038.

The foregoing described embodiment wherein the different components are contained within different other components (e.g., the various elements shown as components of host computer system 1000). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method comprising:
   selecting a class of service of a plurality of classes of service;
   assigning said class of service to a virtual path;
   dynamically reserving resources for said virtual path in a mesh optical network comprising a plurality of nodes coupled by a plurality of optical links in a mesh topology, wherein
   said dynamically reserving said resources comprises:
      allocating resources of each node in a set of nodes in said plurality of nodes in response to an allocation request, and
      identifying a physical path between a first node and a second node of said optical network;
   said physical path is comprised in said set of nodes; and
   said virtual path is provisioned on said physical path.

2. The method of claim 1, further comprising:
   provisioning said virtual path with associated attributes of said one of said classes of service.

3. The method of claim 1, further comprising:
   storing class of service information in a network topology database, wherein said class of service information describes an attribute of said one of said classes of service.

4. The method of claim 1, further comprising:
   using said class of service information in case of a path failure to restore said virtual path.

5. The method of claim 1, wherein said classes of service is one of zero, one, two and three, wherein zero is the lowest class of service, and three is the highest class of service.

6. The method of claim 1, further comprising:
   assigning one of a plurality of path performance attributes to said virtual path.

7. The method of claim 1, further comprising:
   assigning one of a plurality of path implementation attributes to said virtual path.

8. The method of claim 1, further comprising:
assigning one of a plurality of path restoration attributes to said virtual path.

9. The method of claim 8, further comprising:
assigning a restorability to said virtual path;
assigning a releasability of resources of said physical path of said virtual path;
assigning a guaranteed restoration time to said virtual path;
assigning an accessibility for protection channel access to said virtual path; and
assigning a path restoration scheme to said virtual path.

10. The method of claim 9, wherein said restorability of said virtual path is one of 'restorable' and 'not restorable'.

11. The method of claim 9, wherein said releasability of resources of said physical path of said virtual path is one of 'releasable' and 'not releasable'.

12. The method of claim 9, wherein said restoration time can assume one of a plurality of restoration time interval values.

13. The method of claim 12, wherein said one of said restoration time interval values is less than 2 seconds.

14. The method of claim 12, wherein said one of said restoration time interval values is less than 250 milliseconds.

15. The method of claim 12, wherein said one of said restoration time interval values is less than 50 milliseconds.

16. The method of claim 9, wherein said accessibility for protection channel access is one of 'accessible' and 'not accessible'.

17. The method of claim 9, wherein said path restoration scheme is one of a plurality of path restoration schemes.

18. The method of claim 17, wherein said restoration scheme include fast dynamic mesh restoration method.

19. The method of claim 17, wherein said restoration scheme include dynamic unicast restoration method.

20. The method of claim 17, wherein said restoration scheme include 1:N protection restoration method.

21. The method of claim 17, wherein said restoration scheme include 1:1 protection restoration method.

22. The method of claim 17, wherein said restoration scheme include 1+1 static redundant virtual path restoration method.

23. The method of claim 1, wherein:
said physical path comprises a subset of nodes in said set of nodes; and
said dynamically reserving said resources further comprises:
committing resources of each node in said subset of nodes.

24. The method of claim 1, wherein:
said physical path comprises a subset of nodes in said set of nodes; and
said dynamically reserving said resources further comprises:
deallocating resources of each node in said set of nodes other than nodes in said subset of nodes.

25. The method of claim 1, wherein:
said dynamically reserving said resources is performed in response to a failure of said virtual path, and in response to said virtual path being assigned said class of service.

26. A computer system comprising:
means for selecting a class of service of a plurality of classes of service;
means for assigning said class of service to a virtual path;
means for dynamically reserving resources for said virtual path in a mesh optical network comprising a plurality of nodes coupled by a plurality of optical links in a mesh topology, wherein
said means for dynamically reserving said resources comprises:
means for allocating resources of each node in a set of nodes in said plurality of nodes in response to an allocation request, and
means for identifying a physical path between a first node and a second node of said optical network;
said physical path is comprised in said set of nodes; and
said virtual path is provisioned on said physical path.

27. The computer system of claim 26, further comprising:
means for provisioning said virtual path with associated attributes of said one of said classes of service.

28. The computer system of claim 26, further comprising:
means for storing class of service information in a network topology database, wherein said class of service information describes an attribute of said one of said classes of service.

29. The computer system of claim 26, further comprising:
means for using said class of service information in case of a path failure to restore said virtual path.

30. The computer system of claim 26, wherein said classes of service is one of zero, one, two and three, wherein zero is the lowest class of service, and three is the highest class of service.

31. The computer system of claim 26, further comprising:
means for assigning one of a plurality of path performance attributes to said virtual path.

32. The computer system of claim 26, further comprising:
means for assigning one of a plurality of path implementation attributes to said virtual path.

33. The computer system of claim 26, further comprising:
means for assigning one of a plurality of path restoration attributes to said virtual path.

34. The computer system of claim 33, further comprising:
means for assigning a restorability to said virtual path;
means for assigning a releasability of resources of said physical path of said virtual path;
means for assigning a guaranteed restoration time to said virtual path;
means for assigning an accessibility for protection channel access to said virtual path; and
means for assigning a path restoration scheme to said virtual path.

35. The computer system of claim 34, wherein said restorability of said virtual path is one of 'restorable' and 'not restorable'.

36. The computer system of claim 34, wherein said releasability of resources of said physical path of said virtual path is one of 'releasable' and 'not releasable'.

37. The computer system of claim 34, wherein said restoration time can assume one of a plurality of restoration time interval values.

38. The computer system of claim 37, wherein said one of said restoration time interval values is less than 2 seconds.

39. The computer system of claim 37, wherein said one of said restoration time interval values is less than 250 milliseconds.

40. The computer system of claim 37, wherein said one of said restoration time interval values is less than 50 milliseconds.

41. The computer system of claim 34, wherein said accessibility for protection channel access is one of 'accessible' and 'not accessible'.

42. The computer system of claim 34, wherein said path restoration scheme is one of a plurality of path restoration schemes.

43. The computer system of claim 42, wherein said restoration scheme include fast dynamic mesh restoration method.

44. The computer system of claim 42, wherein said restoration scheme include dynamic unicast restoration method.

45. The computer system of claim 42, wherein said restoration scheme include 1:N protection restoration method.

46. The computer system of claim 42, wherein said restoration scheme include 1:1 protection restoration method.

47. The computer system of claim 42, wherein said restoration scheme include 1+1 static redundant virtual path restoration method.

48. The computer system of claim 26, wherein:
said physical path comprises a subset of nodes in said set of nodes; and
said means for dynamically reserving said resources further comprises:
means for committing resources of each node in said subset of nodes.

49. The computer system of claim 26, wherein:
said physical path comprises a subset of nodes in said set of nodes; and
said means for dynamically reserving said resources further comprises:
means for deallocating resources of each node in said set of nodes other than nodes in said subset of nodes.

50. The computer system of claim 26, wherein:
said means for dynamically reserving said resources is configured to respond to a failure of said virtual path, and to said virtual path being assigned said class of service.

51. An optical network comprising:
a plurality of links;
a plurality of nodes, each one of said plurality of nodes coupled to at least one other of said plurality of nodes by at least one of said plurality of links in a mesh topology, wherein:
a virtual path is assigned a class of service selected from a plurality of classes of service;
said optical network is configured to dynamically reserve resources for said virtual path in a mesh optical network by:
allocating resources of each node in a set of nodes in said plurality of nodes in response to an allocation request, and
identifying a physical path between a first node and a second node of said optical network;
said physical path is comprised in said set of nodes; and
said virtual path is provisioned on said physical path.

52. The optical network of claim 51, wherein said optical network is further configured to:
provision said virtual path with associated attributes of said one of said classes of service,
store class of service information in a network topology database, wherein said class of service information describes an attribute of said one of said classes of service, and
use said class of service information in case of a path failure to restore said virtual path.

53. The optical network of claim 51, wherein said classes of service is one of zero, one, two and three, wherein zero is the lowest class of service, and three is the highest class of service.

54. The optical network of claim 51, wherein said optical network is further configured to:
assign one of a plurality of path performance attributes to said virtual path.

55. The optical network of claim 51, wherein said optical network is further configured to:
assign one of a plurality of path implementation attributes to said virtual path.

56. The optical network of claim 51, wherein said optical network is further configured to:
assign one of a plurality of path restoration attributes to said virtual path.

57. The optical network of claim 51, wherein said optical network is further configured to:
assign a restorability to said virtual path;
assign a releasability of resources of said physical path of said virtual path;
assign a guaranteed restoration time to said virtual path;
assign an accessibility for protection channel access to said virtual path; and
assign a path restoration scheme to said virtual path.

58. The optical network of claim 57, wherein said restorability of said virtual path is one of 'restorable' and 'not restorable'.

59. The optical network of claim 58, wherein said path restoration scheme is one of a plurality of path restoration schemes.

60. The optical network of claim 59, wherein said restoration scheme include fast dynamic mesh restoration method.

61. The optical network of claim 59, wherein said restoration scheme include dynamic unicast restoration method.

62. The optical network of claim 59, wherein said restoration scheme include 1:N protection restoration method.

63. The optical network of claim 59, wherein said restoration scheme include 1:1 protection restoration method.

64. The optical network of claim 59, wherein said restoration scheme include 1+1 static redundant virtual path restoration method.

65. The optical network of claim 57, wherein said releasability of resources of said physical path of said virtual path is one of 'releasable' and 'not releasable'.

66. The optical network of claim 57, wherein said restoration time can assume one of a plurality of restoration time interval values.

67. The optical network of claim 66, wherein said one of said restoration time interval values is less than 2 seconds.

68. The optical network of claim 66, wherein said one of said restoration time interval values is less than 250 milliseconds.

69. The optical network of claim 66, wherein said one of said restoration time interval values is less than 50 milliseconds.

70. The optical network of claim 66, wherein said accessibility for protection channel access is one of 'accessible' and 'not accessible'.

71. The optical network of claim 51, wherein:
said physical path comprises a subset of nodes in said set of nodes; and
said optical network is further configured to dynamically reserve said resources by:

committing resources of each node in said subset of nodes.

72. The optical network of claim 51, wherein:
said physical path comprises a subset of nodes in said set of nodes; and
said optical network is further configured to dynamically reserve said resources by:
deallocating resources of each node in said set of nodes other than nodes in said subset of nodes.

73. The optical network of claim 51, wherein:
said optical network is further configured to dynamically reserve said resources in response to a failure of said virtual path, and in response to said virtual path being assigned said class of service.

74. A network element comprising:
a memory comprising computer-executable instructions; and
a processor coupled to the memory and, in response to the computer-executable instructions, configured to:
select a class of service of a plurality of classes of service;
assign said class of service to a virtual path; and
dynamically reserve resources for said virtual path in a mesh optical network comprising a plurality of nodes coupled by a plurality of optical links in a mesh topology, by
allocating resources of each node in a set of nodes in said plurality of nodes in response to an allocation request, and
identifying a physical path between a first node and a second node of said optical network; wherein:
said physical path is comprised in said set of nodes; and
said virtual path is provisioned on said physical path.

75. The network element of claim 74, wherein said processor is further configured to:
provision said virtual path with associated attributes of said one of said classes of service.

76. The network element of claim 74, wherein said processor is further configured to:
store class of service information in a network topology database, wherein said class of service information describes an attribute of said one of said classes of service.

77. The network element of claim 74, wherein said processor is further configured to:
use said class of service information in case of a path failure to restore said virtual path.

78. The network element of claim 74, wherein said classes of service is one of zero, one, two and three, wherein zero is the lowest class of service, and three is the highest class of service.

79. The network element of claim 74, wherein said processor is further configured to:
assign one of a plurality of path performance attributes to said virtual path.

80. The network element of claim 74, wherein said processor is further configured to:
assign one of a plurality of path implementation attributes to said virtual path.

81. The network element of claim 74, wherein said processor is further configured to:
assign one of a plurality of path restoration attributes to said virtual path.

82. The network element of claim 81, wherein said processor is further configured to:

assign a restorability to said virtual path;
assign a releasability of resources of said physical path of said virtual path;
assign a guaranteed restoration time to said virtual path;
assign an accessibility for protection channel access to said virtual path; and
assign a path restoration scheme to said virtual path.

83. The network element of claim 82, wherein said restorability of said virtual path is one of 'restorable' and 'not restorable'.

84. The network element of claim 82, wherein said releasability of resources of said physical path of said virtual path is one of 'releasable' and 'not releasable'.

85. The network element of claim 82, wherein said restoration time can assume one of a plurality of restoration time interval values.

86. The network element of claim 85, wherein said one of said restoration time interval values is less than 2 seconds.

87. The network element of claim 85, wherein said one of said restoration time interval values is less than 250 milliseconds.

88. The network element of claim 85, wherein said one of said restoration time interval values is less than 50 milliseconds.

89. The network element of claim 82, wherein said accessibility for protection channel access is one of 'accessible' and 'not accessible'.

90. The network element of claim 82, wherein said path restoration scheme is one of a plurality of path restoration schemes.

91. The network element of claim 90, wherein said restoration scheme include fast dynamic mesh restoration method.

92. The network element of claim 90, wherein said restoration scheme include dynamic unicast restoration method.

93. The network element of claim 90, wherein said restoration scheme include 1:N protection restoration method.

94. The network element of claim 90, wherein said restoration scheme include 1:1 protection restoration method.

95. The network element of claim 90, wherein said restoration scheme include 1+1 static redundant virtual path restoration method.

96. The network element of claim 74, wherein:
said physical path comprises a subset of nodes in said set of nodes; and
said processor is further configured to dynamically reserve said resources by:
committing resources of each node in said subset of nodes.

97. The network element of claim 74, wherein:
said physical path comprises a subset of nodes in said set of nodes; and
said processor is further configured to dynamically reserve said resources by:
deallocating resources of each node in said set of nodes other than nodes in said subset of nodes.

98. The network element of claim 74, wherein:
said processor is further configured to dynamically reserve said resources in response to a failure of said virtual path, and in response to said virtual path being assigned said class of service.

99. A computer program product comprising:
a computer readable storage medium; and
a set of instructions encoded in the computer readable storage medium and executable to:
- select a class of service of a plurality of classes of service;
- assign said class of service to said virtual path; and
- dynamically reserve resources for said virtual path in a mesh optical network comprising a plurality of nodes coupled by a plurality of optical links in a mesh topology, by
  - allocating resources of each node in a set of nodes in said plurality of nodes in response to an allocation request, and
  - identifying a physical path between a first node and a second node of said optical network; wherein:
    - said physical path is comprised in said set of nodes, and nodes; and
    - said virtual path is provisioned on said physical path.

100. The computer program product of claim 99, wherein said set of instructions is further configured to:
provision said virtual path with associated attributes of said one of said classes of service.

101. The computer program product of claim 99, wherein said set of instructions is further configured to:
store class of service information in a network topology database, wherein said class of service information describes an attribute of said one of said classes of service.

102. The computer program product of claim 99, wherein said set of instructions is further configured to:
use said class of service information in case of a path failure to restore said virtual path.

103. The computer program product of claim 99, wherein said classes of service is one of zero, one, two and three, wherein zero is the lowest class of service, and three is the highest class of service.

104. The computer program product of claim 99, wherein said set of instructions is further configured to:
assign one of a plurality of path performance attributes to said virtual path.

105. The computer program product of claim 99, wherein said set of instructions is further configured to:
assign one of a plurality of path implementation attributes to said virtual path.

106. The computer program product of claim 99, wherein said set of instructions is further configured to:
assign one of a plurality of path restoration attributes to said virtual path.

107. The computer program product of claim 106, wherein said set of instructions is further configured to:
assign a restorability to said virtual path;
assign a releasability of resources of said physical path of said virtual path;
assign a guaranteed restoration time to said virtual path;
assign an accessibility for protection channel access to said virtual path; and
assign a path restoration scheme to said virtual path.

108. The computer program product of claim 107, wherein said restorability of said virtual path is one of 'restorable' and 'not restorable'.

109. The computer program product of claim 107, wherein said releasability of resources of said physical path of said virtual path is one of 'releasable' and 'not releasable'.

110. The computer program product of claim 107, wherein said restoration time can assume one of a plurality of restoration time interval values.

111. The computer program product of claim 110, wherein said one of said restoration time interval values is less than 2 seconds.

112. The computer program product of claim 110, wherein said one of said restoration time interval values is less than 250 milliseconds.

113. The computer program product of claim 110, wherein said one of said restoration time interval values is less than 50 milliseconds.

114. The computer program product of claim 107, wherein said accessibility for protection channel access is one of 'accessible' and 'not accessible'.

115. The computer program product of claim 107, wherein said path restoration scheme is one of a plurality of path restoration schemes.

116. The computer program product of claim 115, wherein said restoration scheme include fast dynamic mesh restoration method.

117. The computer program product of claim 115, wherein said restoration scheme include dynamic unicast restoration method.

118. The computer program product of claim 115, wherein said restoration scheme include 1:N protection restoration method.

119. The computer program product of claim 115, wherein said restoration scheme include 1:1 protection restoration method.

120. The computer program product of claim 115, wherein said restoration scheme include 1+1 static redundant virtual path restoration method.

121. The computer program product of claim 99, wherein said physical path comprises a subset of nodes in said set of nodes, and said set of instructions is configured to dynamically reserve resources further by:
committing resources of each node in said subset of nodes.

122. The computer program product of claim 99, wherein said physical path comprises a subset of nodes in said set of nodes, and said set of instructions is configured to dynamically reserve resources finther by:
deallocating resources of each node in said set of nodes other than nodes in said subset of nodes.

123. The computer program product of claim 99, wherein said set of instructions is configured to dynamically reserve resources in response to a failure of said virtual path, and in response to said virtual path being assigned said class of service.

124. A method of reserving resources for a virtual path in a mesh optical network, the method comprising:
assigning said virtual path one of a plurality of classes of service, wherein
said virtual path is provisioned on a physical path between a first node and a second node of said optical network, and
said optical network comprises a plurality of nodes coupled by a plurality of optical links in a mesh topology;
assigning one of a plurality of path restoration attributes to said virtual path;
assigning a restorability to said virtual path;
assigning a releasability of resources of said physical path of said virtual path;
assigning a guaranteed restoration time to said virtual path;

assigning an accessibility for protection channel access to said virtual path; and assigning a path restoration scheme to said virtual path.

125. The method of claim 124, wherein said path restoration scheme is one of a plurality of path restoration schemes.

126. The method of claim 125, wherein said restoration scheme includes a fast dynamic mesh restoration method.

127. The method of claim 125, wherein said restoration scheme includes a dynamic unicast restoration method.

128. The method of claim 125, wherein said restoration scheme includes a 1:N protection restoration method.

129. The method of claim 125, wherein said restoration scheme includes a 1:1 protection restoration method.

130. The method of claim 125, wherein said restoration scheme includes a 1+1 static redundant virtual path restoration method.

131. A computer system for reserving resources for a virtual path in a mesh optical network, comprising:

means for assigning said virtual path one of a plurality of classes of service, wherein said virtual path is provisioned on a physical path between a first node and a second node of said optical network, and said optical network comprises a plurality of nodes coupled by a plurality of optical links in a mesh topology;

means for assigning one of a plurality of path restoration attributes to said virtual path;

means for assigning a restorability to said virtual path;

means for assigning a releasability of resources of said physical path of said virtual path;

means for assigning a guaranteed restoration time to said virtual path;

means for assigning an accessibility for protection channel access to said virtual path; and means for assigning a path restoration scheme to said virtual path.

* * * * *